US006873616B1

United States Patent
Fedyk et al.

(12) United States Patent
(10) Patent No.: US 6,873,616 B1
(45) Date of Patent: Mar. 29, 2005

(54) QUASI-DETERMINISTIC GATEWAY SELECTION ALGORITHM FOR MULTI-DOMAIN SOURCE ROUTED NETWORKS

(75) Inventors: Donald Wayne Fedyk, Nepean (CA); Peter James Ashwood-Smith, Hull (CA); Darek Robert Skalecki, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,955

(22) Filed: Dec. 28, 1998

(51) Int. Cl.[7] .............................................. H04L 12/66
(52) U.S. Cl. ....................................... 370/357; 370/401
(58) Field of Search ................................ 370/351–356, 370/400, 401, 402, 238, 238.1, 252; 709/240, 241, 238, 239, 242, 243, 244

(56) References Cited

U.S. PATENT DOCUMENTS

| | | | | |
|---|---|---|---|---|
| 4,862,496 A | * | 8/1989 | Kelly et al. .................. 379/221 |
| 4,905,233 A | * | 2/1990 | Cain et al. .................. 370/94.1 |
| 5,088,032 A | * | 2/1992 | Bosack ....................... 395/200 |
| 5,596,719 A | * | 1/1997 | Ramakrishnane et al. ...................... 395/200.02 |
| 5,699,347 A | * | 12/1997 | Callon ......................... 370/238 |
| 6,061,736 A | * | 5/2000 | Rochberger et al. ........ 709/241 |
| 6,084,858 A | * | 7/2000 | Matthews et al. ........... 370/238 |
| 6,301,244 B1 | * | 10/2001 | Huang et al. ................ 370/351 |
| 6,314,093 B1 | * | 11/2001 | Mann et al. ................. 370/351 |
| 6,366,576 B1 | * | 4/2002 | Haga .......................... 370/352 |
| 6,426,955 B1 | * | 7/2002 | Gossett Dalton, Jr. et al. ........................... 370/401 |
| 6,584,093 B1 | * | 6/2003 | Salama et al. .............. 370/351 |

* cited by examiner

Primary Examiner—Chau Nguyen
Assistant Examiner—Duc Duong
(74) Attorney, Agent, or Firm—Neil G. J. Mothew

(57) ABSTRACT

A system and a method of selecting gateways using stored metrics associated with each route out of the domain and with each destination is presented. The metrics represent some measure to be minimized by the routing system, such as cost or delay. The route is selected quasi-deterministically. A first selection is made deterministically based on the stored metrics in order to attempt to use the optimum path. If a connection can not be established through the deterministically selected gateway, an alternate gateway is selected randomly from among the remaining gateways capable of reaching the destination at a reasonable cost.

8 Claims, 6 Drawing Sheets

| DESTINATION 152 | METRIC (COST) 154 | GATEWAY 156 |
|---|---|---|
| B1 | 100 | G1 |
| B1 | 200 | G2 |
| C1 | 150 | G1 |
| C1 | 100 | G2 |
| D1 | 200 | G1 |
| D1 | 300 | G2 |
| D2 | 250 | G1 |
| D2 | 350 | G2 |

FIG. 2A

| DESTINATION 162 | METRIC (COST) 164 | GATEWAY 166 |
|---|---|---|
| B1 | 100 | G3 |
| B1 | 200 | G7 |
| C1 | 200 | G3 |
| C1 | 150 | G7 |
| D1 | 200 | G3 |
| D1 | 300 | G7 |
| D2 | 250 | G3 |
| D2 | 300 | G7 |

FIG. 2B

QUASI-DETERMINISTIC GATEWAY SELECTION ALGORITHM FOR MULTI-DOMAIN SOURCE ROUTED NETWORKS

FIELD OF THE INVENTION

This invention relates generally to routing through multiple-domain source-routed networks, which include path-oriented networks and source routed services on connectionless networks.

BACKGROUND OF THE INVENTION

When a connection is initiated in a source routed network, a connection must be established between the source end point and the destination end point. In small networks, containing a manageable number of nodes, path selection is accomplished by reference to network topology information stored at each node in the network. The source node consults its stored network topology information and determines a valid path to the destination node. As the topology of the network is changed, such as by adding or removing nodes, the topology information at each node in the network is updated.

As the size of the network grows, the amount of information that must be stored at each node becomes prohibitively large. In addition, the time required for the topology information in each node to be updated increases as does the likelihood that a node contains stale information at any given time. One solution to this problem is to divide the network into several domains, each of which contains a manageable number of nodes. A network may also be divided into domains for administrative reasons. Each node contains topology information about its own domain but only limited topology information about other domains. If a connection is required to a destination node within the same domain as the source node, the source node consults its domain topology information and determines a valid path. Because the stored information is limited to only one domain, it is of a manageable size and is updated quickly when the domain topology changes.

Domains are connected to each other through gateways using inter-domain links. A path to a destination node outside the domain of the source node is established through these gateways. For any particular connection, the gateway through which the connection leaves a domain is referred to as an exit gateway, and the gateway through which the connection enters a domain is referred to as an entry gateway. A domain usually contains more than one exit gateway that can reach the domain of the destination node. An exit gateway may also be able to reach the destination domain through several entry gateways, possibly in different adjacent domains. The connection will be from the source node, through the node's domain to the exit gateway, and across the inter-domain link to the entry gateway of the adjacent domain. A sequence of such connections will be established until the adjacent domain, containing the entry gateway, is the domain in which the destination end point is located.

Any node at which a routing decision must be made, either a source node, an exit gateway connected to multiple entry gateways in adjacent domains, or an entry gateway of an intermediary domain, must select one of the eligible gateways through which to establish a connection. In static routing systems, the selection of a gateway is fixed for any given destination. This can result in overloading of gateways. Furthermore, if a connection through the pre-selected gateway becomes impossible, due to overloading or a fault in the network, connections will be blocked. Existing dynamic routing systems allow more flexibility in selection of gateways, but these are based on limited topology and bandwidth availability information propagated between domains. The propagation of this information defeats the purpose of dividing a network into domains in order to limit topology information to manageable volumes. The propagation of this information also takes time, and may be stale by the time a connection is requested.

SUMMARY OF THE INVENTION

It is an object of the present invention to provide an apparatus and a method which allow dynamic routing of a connection between nodes of different domains without requiring propagation of topology and bandwidth availability information between domains. Each node implementing the invention may be referred to as a decision point. A number of domains connected together containing nodes implementing the invention collectively constitute a routing system. Within each domain, metrics are associated with each gateway leading out of the domain and with each destination outside the domain. The metric represents some quantity to be minimized by when selecting a route, such as cost, number of hops, or delay. The routing system selects an exit gateway quasi-deterministically. A selection is first made deterministically by selecting the exit gateway with the best metric associated with the destination of the connection. If a connection can not be established through that exit gateway, an alternate exit gateway is selected randomly from among the remaining exit gateways. In the random selection no preference is given to the exit gateways that have lower metrics associated with the destination, other than to possibly confine the selection process to exit gateways with metrics satisfying some predetermined criteria. If the exit gateway is connected to more than one entry gateway in adjacent domains, the exit gateway then selects one of the adjacent entry gateways using the same quasi-deterministic method. This selection method combines the advantages of a deterministic selection, resulting in close to optimum routing, and the advantages of a random selection, resulting in reduced gateway overloading and reduced likelihood of repeated failed connection attempts.

The procedure is recursive, and is carried out independently at a source node and each gateway that attempts to reach a node in a different domain.

Broadly, the invention provides a method for a node to select a gateway from among at least two gateways, comprising the steps of: storing information associating a metric with each gateway with respect to each of one or more destinations; upon receiving a connection request to a destination, the further steps of: i) deterministically selecting a first gateway having an optimum metric with respect to the destination, ii) sending a connection request to the first gateway, iii) if a connection can not be established to the destination via the first gateway, randomly selecting a second gateway from among the gateways other than the first gateway, and iv) sending a connection request to the second gateway.

An advantage of this invention then is the dynamic selection of a route through a multi-domain network without requiring propagation of topology or bandwidth availability information between domains. The selection is quasi-deterministic. At each decision point which is an entry point of a domain, including the source node and entry gateways, a deterministic selection selects the optimum exit gateway through which an inter-domain route will be established. If a connection can not be established through the optimum exit gateway, a random selection of an exit gateway is then made. A similar selection procedure is carried out by decision points which are exit gateways which must choose from more than one entry gateways in adjacent domains. Although this may result in a less than optimum route, this will only occur if the first choice of route failed and will also prevent repeated failed connection attempts from being routed along the same route.

BRIEF DESCRIPTION OF THE DRAWINGS

The invention will now be described in greater detail with reference to the accompanying diagrams, in which:

FIG. 2a is a diagram of the stored gateway information of the invention, at a node of the network of FIG. 1;

FIG. 2b is a diagram of the stored gateway information of the invention, at another node of the network of FIG. 1;

DETAILED DESCRIPTION OF THE PREFERRED EMBODIMENTS

Figure 1:
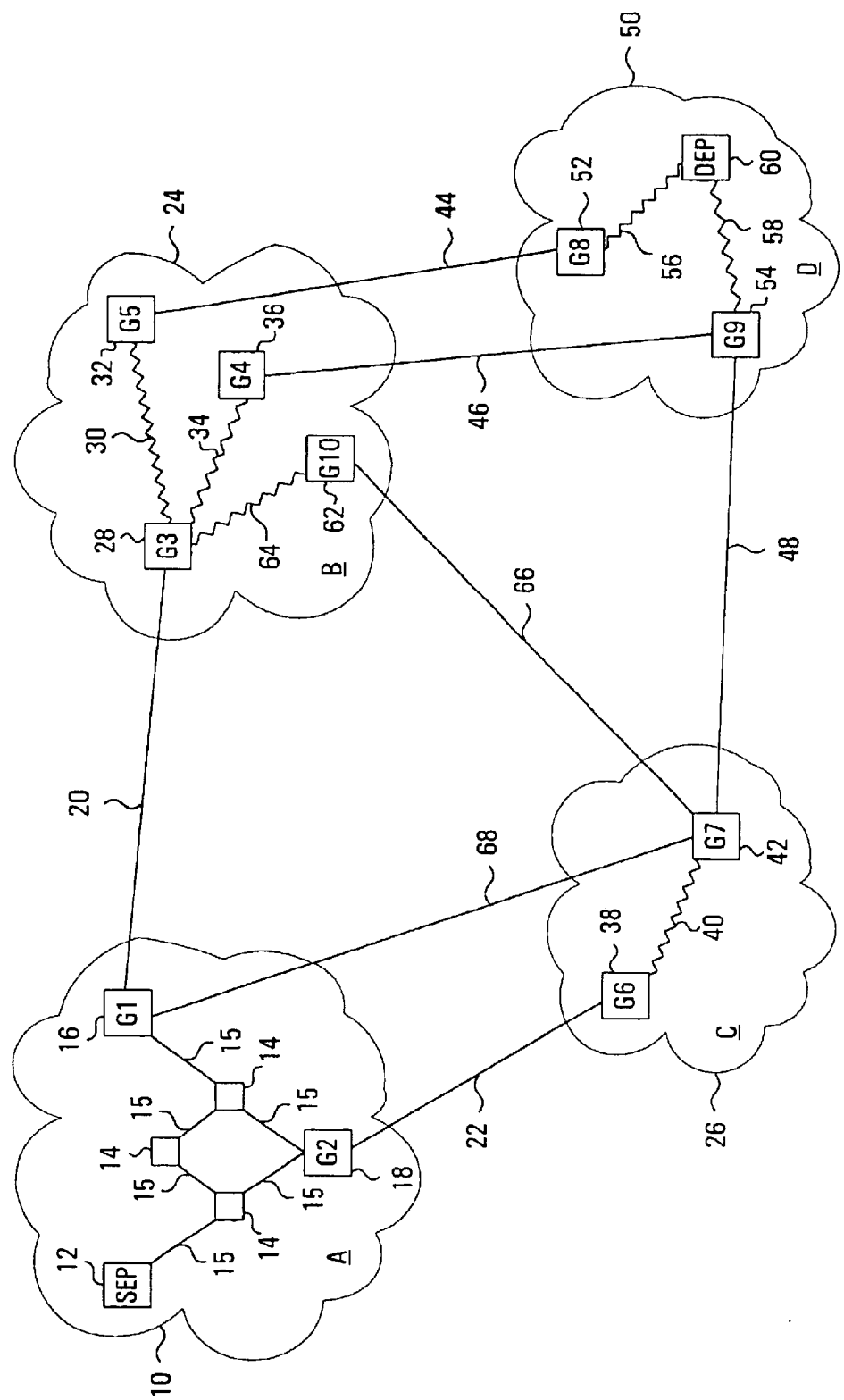
FIG. 1 is a diagram of a multi-domain network.

An instantiation of an embodiment of the invention will be described with reference to an example of a multi-domain network, illustrated in FIG. 1. The network of FIG. 1 consists of four domains: domain A 10, domain B 24, domain C 26, and domain D 50. Domain A 10 contains a Source End Point (SEP) 12 from which a connection originates, several other nodes 14 interconnected with intra-domain links 15, and two nodes which act as gateways 16 and 18 denoted by G1 and G2. G1 16 is connected to another gateway G3 28 in an adjacent domain, domain B 24, via an inter-domain link 20, and to another gateway G7 42 in another adjacent domain, domain C 26, via inter-domain link 68. Likewise, G2 18 is connected to a gateway G6 38 in domain C 26 via the inter-domain link 22. Domain D 50 contains a Destination End Point (DEP) 60 to which it is assumed the SEP 12 needs to be connected. Domain B 24 and domain C 26 are each connected to each other and to domain D 50, through other gateways and inter-domain links. Within domain B 24, domain C 26, and domain D 50 there are intra-domain routes represented by jagged lines 30, 34, 40, 56, 58, and 64. The intra-domain routes may pass through several nodes which are not shown for reasons of clarity, but are interconnected in the same manner as the nodes 14 of domain A 10.

This invention is concerned with selecting a route from a SEP which has launched a Connection Request to a DEP identified in the address of the Connection Request. Routing decisions according to the invention are preferably implemented by hardware, or software, or a combination of hardware or software, at each decision point encountered during a connection set-up. A decision point is defined as any node which may have to make a gateway selection decision. In the domain in which the connection originates the decision point will be the SEP. In downstream domains the entry gateway of the domain will be a decision point. Each exit gateway connected to more than one entry gateway capable of reaching the DEP is also a decision point. Each decision point is responsible for selecting the exit gateway through which the route will leave the domain or for selecting the adjacent entry gateway through which the route will enter an adjacent domain. More generally, each decision point is responsible for selecting the next gateway in a connection request. Each node has topology information about its own domain. In order to facilitate the routing decisions described below, each node has stored gateway information consisting of metrics associated with each gateway through which the destination can be reached, one metric for each gateway and each of the destinations within other domains in the network reachable through the gateway. For example, the information stored by SEP 12 in the network illustrated in FIG. 1 is generally indicated by 150 shown in FIG. 2a and consists of eight entries. Each entry consists of an exit gateway 156, a destination 152, and a metric 154. The node determines the destination of the connection from the address of the DEP in the Connection Request. The destination 152 is a logical grouping of some of the Destination End Points (DEPs) in a domain. The DEPs are identified as belonging to a destination by the address of the DEP. Each destination is confined to one domain, although there may be more than one destination in a domain. The destinations in FIG. 1 are not shown, as they are logical groupings. Destination B1 of the stored gateway information shown in FIG. 2a is located in domain B 24 of the example network of FIG. 1. Destination C1 is located in domain C 26, and destinations D1 and D2 are located in domain D 50. Each destination 152 can be reached through one of two exit gateways: G1 and G2. The metric 154 in FIG. 2a represents an approximation of a cost associated with reaching each destination 152 through each gateway 156. The metric of the first entry 151 identifies a cost associated with reaching a destination B1 through the exit gateway G1. Similarly, the information stored by gateway G1 in the network illustrated in FIG. 1 is generally indicated by 160 in FIG. 2b, and consists of eight entries. Each entry consists of a destination 162, an adjacent entry gateway 166, and a metric 164 which in this case represents an approximation of a cost associated with reaching each destination 162 through each gateway 166. The metrics stored by a SEP or an entry gateway for a destination and an exit gateway are the most optimal of the metrics stored by that exit gateway for that destination. For example, gateway G1 can reach destination B1 through either of two adjacent entry gateways, G3 and G7. Gateway G1 stores metrics for these two destination-gateway combinations at entries 161 and 163 respectively. However only the lowest metric for reaching destination B1, namely that of entry 161, is stored by the SEP at entry 151. The costs 154 and 164 associated with each gateway and each destination are in arbitrary units, and only their relative values are important for illustrating gateway selection according to the invention.

Figure 3:
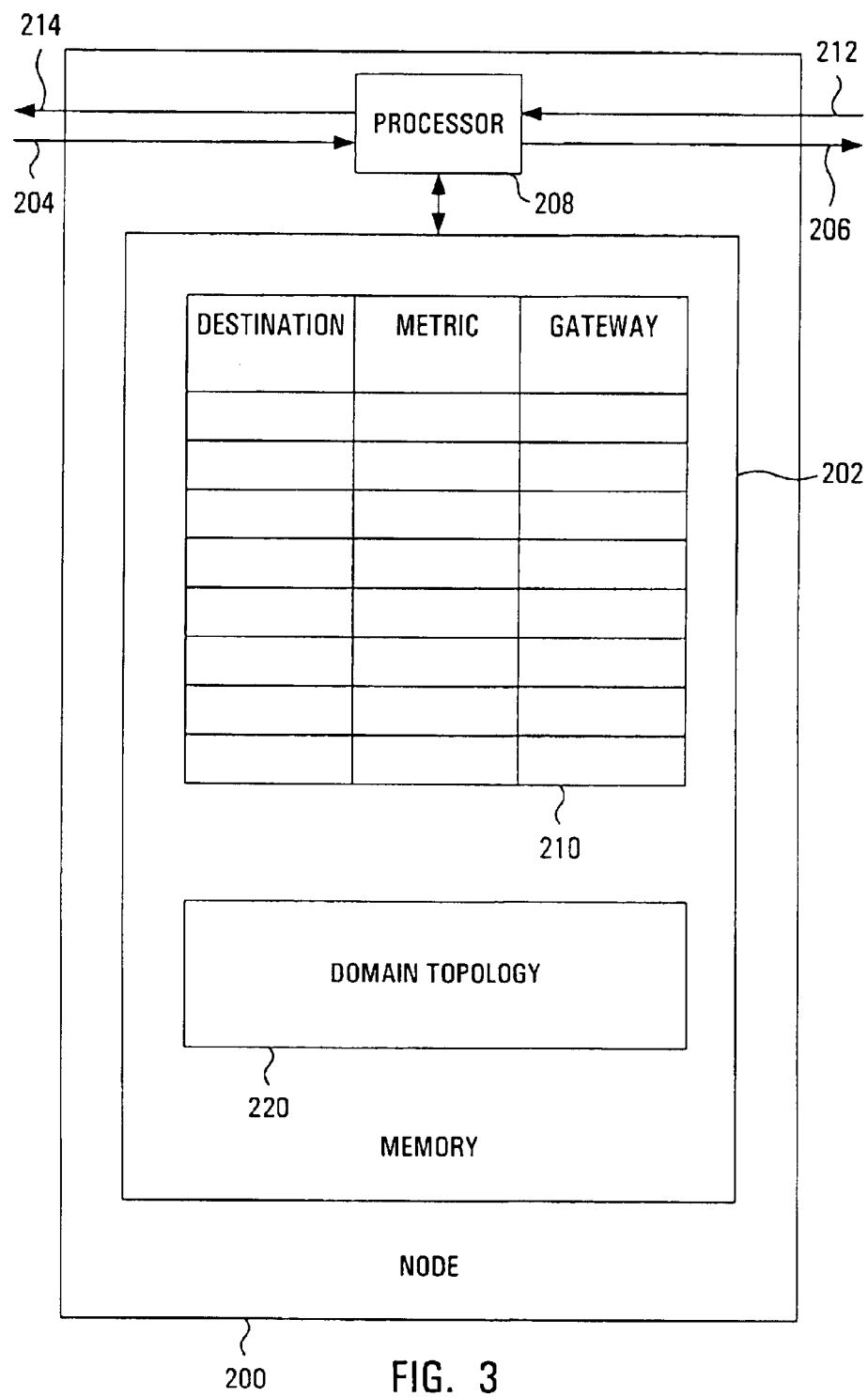
FIG. 3 is a block diagram of a node on which the invention is implemented.

The high level operation of the invention at a ID decision point is shown in FIG. 3. The node 200 contains a processor 208 for making routing decisions according to an embodiment of the invention and memory 202 for storing information required by the processor 208. Among other information, the memory 202 stores topology information 220 for the domain of the node and stores gateway information 210 for gateways leading out of the domain of the node. For the SEP 12, the stored gateway information 210 would be equivalent to the stored gateway information 150 illustrated in FIG. 2a. The stored topology information 220 and the stored gateway information 210 are not drawn to scale, and the amount of memory required to store the topology information will usually be much greater than the amount of memory required to store the gateway information.

In operation, by way of overview, when a Connection Request 204 arrives at the node, the processor 208 parks the Connection Request 204 by storing a copy of the Connection Request in memory, determines the destination of the connection, and consults the stored gateway information 210. The processor 208 selects the gateway through which the destination can be reached at the lowest cost, as indicated by the stored gateway information 210, and forwards the Connection Request 206 to the selected gateway. If the connection can not be established to or through the selected gateway, the processor 208 receives a Connection Failed signal 212. The processor 208 marks that gateway as having failed to establish a connection for this connection. The marking of the gateway is achieved by adding the identity of that gateway to an information portion of the parked Connection Request for this connection, for example, and does not modify the stored topology information 220. The processor 208 then consults the stored gateway information 210 and randomly selects an alternate gateway capable of reaching the destination, as indicated by the stored gateway information 210, from the remaining gateways and forwards the Connection Request 206 to the alternate selected gateway. If that connection also fails, preferably the processor 208 sends a Connection Failed signal 214 to the node which had sent the initial Connection Request 204.

Figure 4A:
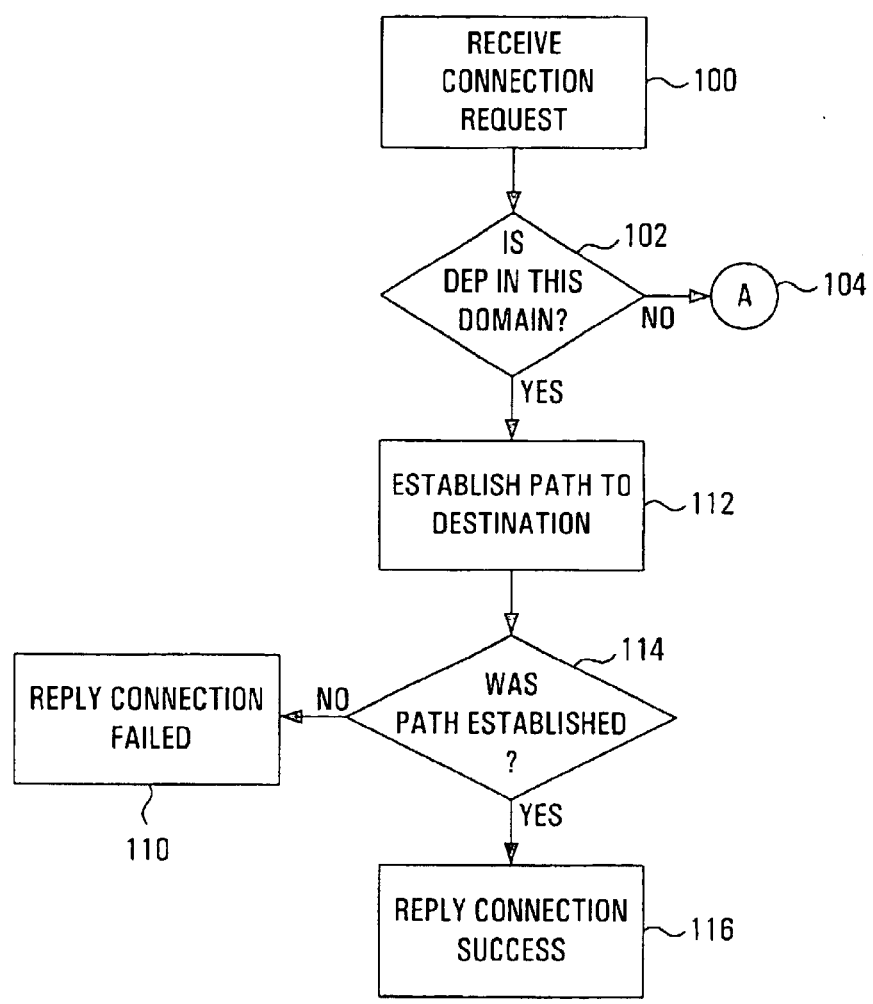
FIG. 4 is a flowchart of the method of the invention.
Figure 4B:
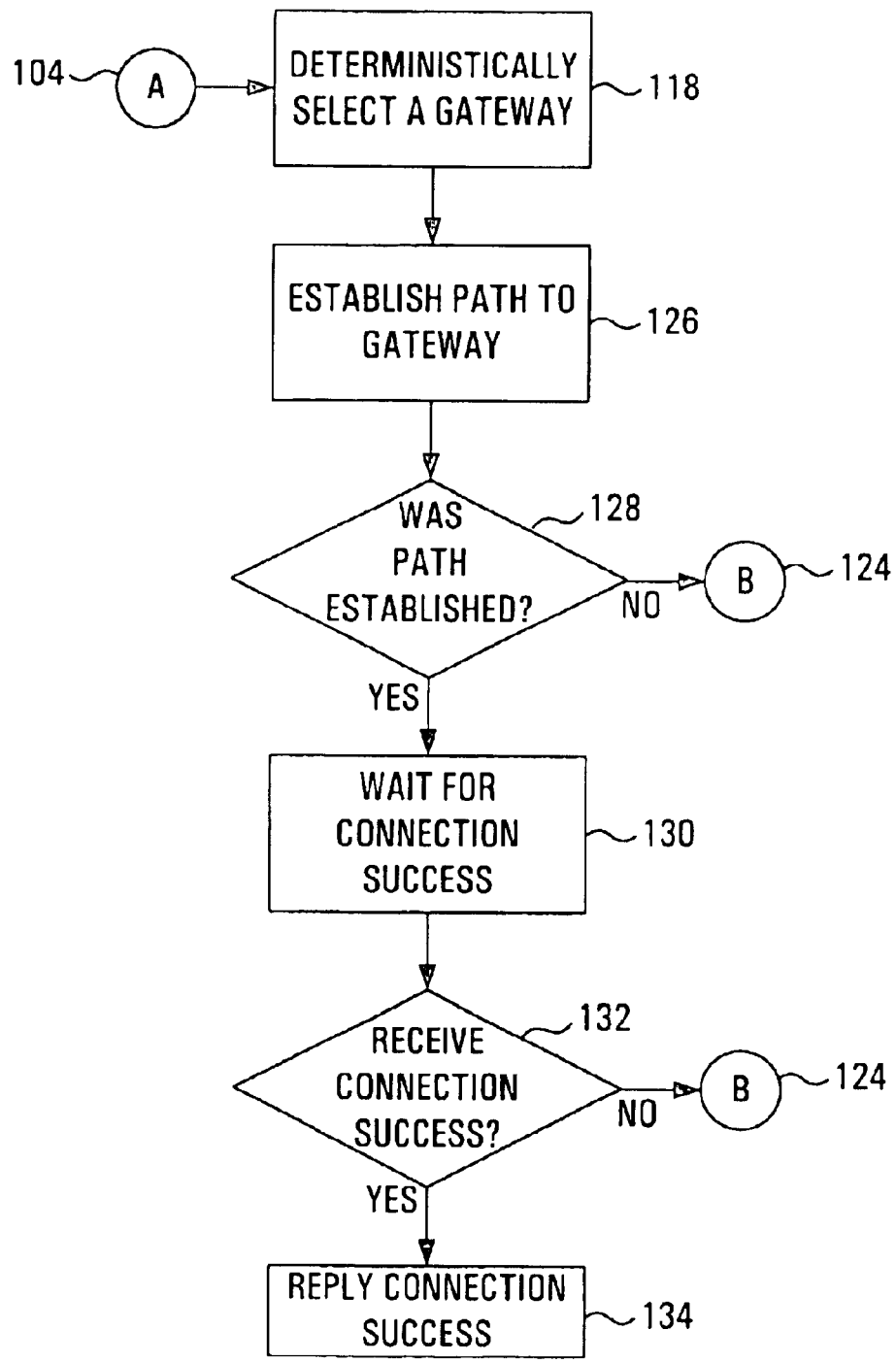
Figure 4C:
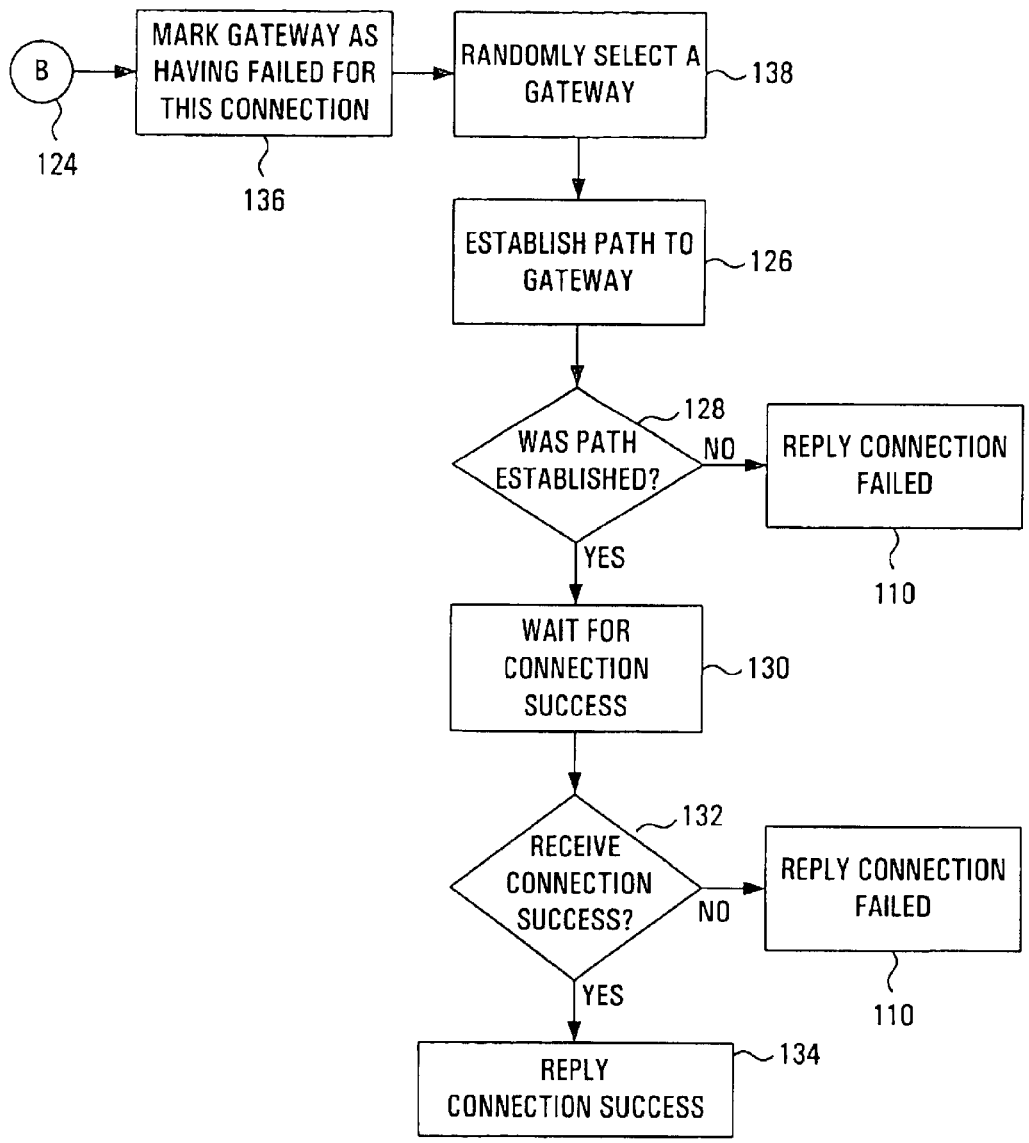

The method of the invention as carried out by the processor 208 is illustrated in more detail in FIGS. 4a, 4b and 4c. At step 100 a decision point receives a request to route to a Destination End Point (DEP). In the description which follows, no assumption is made regarding the location of the decision point. It could be the SEP, an entry gateway of an intermediary domain, an exit gateway, or the entry gateway of the domain in which the DEP is located. At step 102 the decision point checks the address of the DEP to determine if the DEP is located in the same domain as the decision point. If the DEP is located in this domain, the decision point attempts to establish a path to the DEP by using a conventional intra-domain routing method at step 112. The intra-domain routing method may make multiple attempts to establish the path. For an individual connection, a path to the DEP may not be able to be established for one of several reasons, such as a failure within the domain, or a lack of resources such as bandwidth, processor time, or logical channel numbers. If a path can not be established for any reason then the decision point sends a Connection Failed signal to the preceding node at step 110. If a path is established, then the decision point sends a Connection Success signal to the preceding node.

If the decision point determines at step 102 that the DEP is not in the same domain as the decision point, the decision point must select a gateway. If the decision point is the SEP or an entry gateway, an exit gateway must be selected. If the decision point is an exit gateway, an entry gateway in an adjacent domain must be selected. In either case the selection procedure is the same, and is illustrated beginning in FIG. 4b. The decision point first selects a gateway deterministically, at step 118. The decision point consults its stored information concerning the gateways and selects the gateway that can reach the destination, determined from the address of the DEP, most optimally according to the stored metrics. If the stored gateway information indicates that more than one gateway have equivalent optimum stored metrics, then one of those optimum gateways is selected randomly. The selection of a gateway is limited to those gateways which do not connect to domains through which the routing has already passed. This prevents routing loops and is possible because the identification of each of these domains is tracked as the route through the domain is established, and a domain identifier is stored in the parked Connection Request.

At step 126 the decision point attempts to establish a path to the selected gateway using conventional methods. If the decision point is an exit gateway and the selected gateway is an adjacent entry gateway then the path will simply be the inter-domain link connecting the two gateways. If the decision point is the SEP or an entry gateway and the selected gateway is an exit gateway, then the path will be an intra-domain route and must be established using conventional intra-domain routing methods and multiple attempts may be made. For an individual connection, a path to the gateway may not be able to be established for any of several reasons. For example, the path may not be established due to a fault, or due to a lack of any type of resource such as bandwidth, processor time, or logical channel numbers. If a path to the gateway is established at step 128 the decision point awaits a Connection Success signal from the selected gateway at step 130. If the decision point receives a Connection Success signal at step 132, then it propagates the Connection Success signal back towards the user by sending its own Connection Success signal to the preceding node at step 134.

As discussed in detail below, each downstream decision point may make up to two failed routing attempts before cranking back to the previous decision point. Because of this, there may be a large delay before a Connection Success signal is received. Preferably, in step 130 a timer is started, and if a Connection Success signal is not received within a pre-determined time the connection request is abandoned.

If a path could not be established for any reason at step 128 or if the decision point does not receive a Connection Success signal at step 132, then the decision point selects an alternate gateway non-deterministically. This procedure is illustrated in FIG. 4c. At step 136 the decision point flags the deterministically selected gateway as one through which a connection could not be established. As described above, this is done by adjusting values within the parked Connection Request, and is not done by changing the stored topology information. In this way when a new connection attempt is made, by this user or by another, the gateway will still be available for selection. This is important because the reason for the connection failure through the deterministically selected gateway may be temporary. The decision point then consults its stored gateway information at step 138 and randomly selects an alternate gateway from among the remaining gateways through which the destination can be reached. As in the deterministic selection the random selection of a gateway is limited to those gateways which do not connect to domains through which the routing has already passed, in order to avoid routing loops. The remainder of the procedure is identical to that illustrated in FIG. 2b for connecting to the deterministically selected gateway, aside from the action taken if a connection can not be established to or through the alternate gateway. If a path can not be established to the alternate gateway (failure at step 128) or the decision point does not receive a Connection Success from the alternate gateway (failure at step 132) then the connection can not be completed through this decision point as preferably no further attempts are made to select a gateway. The decision point will then indicate Connection Failed to the preceding node at step 110.

The operation and advantages of the invention will be demonstrated by reference to an example connection in the network illustrated in FIG. 1. It will be assumed that the invention is implemented on at least the SEP 12 and the gateways G1 16, G3 28, and G7 42. The invention need not be implemented on the entry gateways G8 52 and G9 54 in this example since they will establish a route to the DEP 60 using conventional intra-domain routing. The invention need not be implemented on exit gateways G4 36 and G5 32 in this example since they only have one choice of adjacent entry gateway. However, the invention would ideally be implemented on every node in the network as any node in the network may be a decision point, either an SEP, an entry gateway, or an exit gateway, for a connection. In the example connection, a user accesses the network through the SEP 12 in domain A 10, and wishes to be connected to a DEP 60 at destination D1 (not shown) in domain D 50. Since the DEP 60 is not in the domain of the SEP 12, the SEP 12 must select a gateway at step 118 of FIG. 4b. The SEP 12 consults its stored gateway information and determines that both G1 16 and G2 18 can reach the destination D1. The SEP 12 selects G1 16 since the gateway G1 16 can reach destination D1 at a lower cost than can gateway G2 18 (see the example metrics of FIG. 2a). The SEP 12 establishes a path along the nodes 14 to G1 16. Since G1 16 is implementing the invention independently of the SEP 12, a new flow of FIG. 4 starts. The DEP 60 is not in this domain 10, so G1 16 must select an adjacent entry gateway. The processor running on G1 16 consults its stored gateway information for gateways to which it is attached and determines that G3 28 and G7 42 can each reach the destination D1, and that gateway G3 28 can do so at the least cost (see the example metrics of FIG. 2b). It successfully connects to G3 28 along the inter-domain link 20 connecting the two gateways. Since G3 28 is implementing the invention independently of G1 16, a new flow of FIG. 4 starts. The processor of G3 28 consults its stored gateway information for gateways within this domain (not shown) and determines that G4 36, G5 32, and G10 62 can each reach the destination D1, and that G5 32 can do so at the least cost. It successfully connects to G5 32 along intra-domain links 30. G5 32 successfully connects to entry gateway G8 52 along inter-domain link 44. The DEP 60 is in the same domain as G8 52, so G8 52 attempts to make an intra-domain connection to the DEP 60 along intra-domain links 56. However in this example no intra-domain connection can be established. G8 52 informs G5 32 that the connection could not be completed. If the invention were being implemented on G5 132, then the routing attempt would be cranked back to G5 32. However G5 32 has only one choice of gateway, namely G8 52, and so G5 32 simply informs G3 28 that the connection could not be completed, and the routing attempt is cranked back to G3 28. Crank back is the return of gateway selection decision to an upstream decision point, and is possible because of the recursive nature of the invention. Each decision point implements the algorithm independently, and triggers execution of the invention on downstream decision points by sending Connection Requests to the gateway it selects. Crank back occurs when a downstream decision point can not establish a connection to the DEP and sends a Connection Failed signal to its upstream decision point and shuts down its implementation of the invention. The upstream decision point receives the Connection Failed signal at step 132 in FIG. 4b or 4c, and carries on execution of its own implementation of the invention.

Returning to the example connection, G3 32 has just been informed of connection failure at step 132 in FIG. 4b. The embodiment of the invention implemented on G3 32 marks the gateway G5 32 as having failed for this connection attempt, and randomly selects one of G4 36 and G10 62 as an alternate gateway at step 138 of FIG. 4c. The invention provides an increased amount of loadsharing between G4 36 and G10 62 amongst all connections from domain A 10 to domain D 50. In this example the random selection by the invention implemented on G3 28 selects the gateway G4 36.

If a connection from G4 62 to G9 54 and on to the DEP 60 can not be established, then G3 28 is informed of this second connection failure at step 132 of FIG. 4c. G3 28 sends a Connection Failed signal to the preceding node G1 16, whereupon the implementation of the invention is completed for G3 28. The routing attempt cranks back to gateway G1 16 which is informed at step 132 of FIG. 4b of its implementation of the invention that the connection attempt through the gateway G3 28 has failed. This demonstrates the recursive nature of the invention when implemented on several nodes within a network. The gateway G1 16 selects an alternate gateway from its stored gateway information, in this case G7 42, and the routing attempt moves forward through a second intermediary domain, domain C 26. If a connection can not be established through G7 42, G1 16 is informed of the connection failure at step 132 of FIG. 4c. G1 16 sends a Connection Failed signal to the preceding node, the SEP 12, and the implementation of the invention on G1 16 completes. The SEP 12 receives the Connection Failed signal at step 132 of FIG. 4b and randomly selects an alternate gateway, in this case G2 18, and a connection is attempted through G2 18. If a connection can not be established through G2 18, the SEP 12 receives a Connection Failed signal at step 132 of FIG. 4c. Since this node is the SEP, the user is informed that the connection has failed and the implementation of the invention on the SEP 12 completes.

Most users alerted of a connection failure immediately attempt to make the connection again. The same route through G1 16, G3 28, G5 32, and G8 52 would be tried first since the first gateway selected by each decision point is selected deterministically, but subsequently attempted routes are likely to be different. Another advantage of the invention is demonstrated if that route through G5 32 again fails and the routing attempt is cranked back to G3 28. The invention selects the alternate gateway randomly and may select G10 62, rather than G4 36, through which a connection attempt may succeed. The more exit gateways from which to choose, the greater the likelihood that the invention will not re-select G4 36 and the greater the likelihood that the second connection attempt by the user will succeed.

The invention is implemented in the form of hardware and/or software installed on nodes in the communication network. The invention need not be implemented on every node in the network. In fact this will likely not be possible as different domains are often administered by different entities. However, the advantage of the invention increases with the number of nodes implementing the invention. As the number of nodes implementing the invention increases, the likelihood of the invention being used at any stage in the routing of a connection increases.

The invention could make more than one attempt at selecting a random gateway after the deterministically selected gateway fails to establish a connection. If a randomly selected gateway fails to establish a connection, that gateway would be marked as having failed to establish a connection for this connection, and another gateway could be selected randomly from among the remaining gateways. This could be repeated yet again, but each extra attempt to randomly select a gateway will increase the delay before the user is alerted about the connection failure if no selected gateway can establish a connection. Alternatively, more than one gateway could be selected deterministically before switching to random selection.

The random selection of a gateway need not be purely random. The selection could be weighted in favour of more optimal gateways, such as those with a lower metric associated with the destination. As more weighting is applied to the random selection the more likely that the optimum available path will be found, but at the same time the advantages gained with random selection (loadsharing, lower probability of repeated connection failures) diminish.

The random selection of a gateway could also limit selection to the gateways satisfying some predetermined criteria. For example, only the gateways whose metrics indicate that the destination can be reached through the gateway at some reasonable cost could be considered for selection.

The gateway selection is preferably carried out by hardware. This can be in one of several typical forms for implementing algorithms, such as an ASIC or a Programable Logic Device. Alternatively the gateway selection could be carried out by software running on the processor of a node, although speed requirements for gateway selection make this a less preferable embodiment.

The invention can be implemented in any type of source routed network, including path-oriented networks and source routed services on connectionless networks.

What has been described is merely illustrative of the application of the principles of the invention. Other arrangements and methods can be implemented by those skilled in the art without departing from the spirit and scope of the present invention.

We claim:

1. A method for a node to select a gateway from among at least two gateways, comprising the steps of:
    storing information associating a metric with each gateway with respect to each of one or more destinations;
    upon receiving a connection request to a destination, the further steps of:
        i) deterministically selecting a first gateway having an optimum metric with respect to the destination,
        ii) sending a connection request to the first gateway,
        iii) if a connection can not be established to the destination via the first gateway, randomly selecting a second gateway from among the gateways other than the first gateway, and
        iv) sending a connection request to the second gateway; and
    wherein the connection request contains zero or more identifiers identifying domains through which the connecting route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

2. A method for a node to select a gateway from among at least two gateways, comprising the steps of:
    storing information associating a metric with each gateway with respect to each of one or more destinations;
    upon receiving a connection request to a destination, the further steps of:
        i) deterministically selecting a first gateway having an optimum metric with respect to the destination,
        ii) sending a connection request to the first gateway,
        iii) if a connection can not be established to the destination via the first gateway, randomly selecting a second gateway from among the gateways other than the first gateway, and
        iv) sending a connection request to the second gateway;
    wherein the step of randomly selecting a second gateway applies a weighting factor to each gateway, the weighting factor taking into account the metric of each gateway with respect to the destination; and
    wherein the connection request contains zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

3. A method for a node to select a gateway from among at least two gateways, comprising the steps of:
    storing information associating a metric with each gateway with respect to each of one or more destinations;
    upon receiving a connection request to a destination, the further steps of:
        i) deterministically selecting a first gateway having an optimum metric with respect to the destination,
        ii) sending a connection request to the first gateway,
        iii) if a connection can not be established to the destination via the first gateway, randomly selecting a second gateway from among the gateways other than the first gateway, and
        iv) sending a connection request to the second gateway;
    wherein the step of randomly selecting a second gateway is further limited to the gateways whose metric with respect to the destination is within a preset range; and
    wherein the connection request contains zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

4. In a communication network containing a plurality of domains, electronic hardware for use in a node in a domain, the electronic hardware containing circuitry for carrying out steps to select a gateway, the domain having at least two gateways, the node having stored information associating a metric with each gateway with respect to each of one or more destinations, and the steps comprising the steps of:
    deterministically selecting a first gateway having an optimum metric with respect to a destination,
    sending a connection request to the first gateway,
    if a connection can not be established to the destination via the first gateway, randomly selecting a second gateway from among the gateways other than the first gateway, and
    sending a connection request to the second gateway; and
    wherein the circuitry selects a gateway upon receiving a connection request, the connection request containing zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

5. A node comprising:
    memory for storing information associating a metric with each of one or more gateways with respect to each of one or more destinations reachable through the respective gateways;

means for launching a connection request to a selected gateway;

means for selecting the selected gateway which deterministically selects a first gateway having an optimum metric with respect to a destination, and if a connection can not be established to the destination via the first gateway, randomly selects a second gateway from among the gateways other than the first gateway; and wherein the means for selecting the selected gateway selects a first gateway upon receiving a connection request, the connection request containing zero or more identifiers identifying domains through which the connection route has already passed, and the means for selecting the selected gateway does not select a gateway leading to a domain indicated by the identifiers in the connection request.

6. A method for a node to select a gateway from among at least two gateways, comprising the steps of:

storing information associating a metric with each gateway with respect to each of one or more destinations;

upon receiving a connection request to a destination, the further steps of:
  i) deterministically selecting a first gateway having an optimum metric with respect to the destination,
  ii) sending a connection request to the first gateway,
  iii) if a connection can not be established to the destination via the first gateway, randomly selecting a second gateway from among the gateways other than the first gateway, and
  iv) sending a connection request to the second gateway; and wherein if more than one gateway have the optimum metric with respect to the destination, the step of deterministically selecting a first gateway randomly selects the first gateway from among the gateways having the optimum metric, and wherein the connection request contains zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

7. A method for a node to select a gateway from among at least two gateways, comprising the steps of:

storing information associating a metric with each gateway with respect to each of one or more destinations;

upon receiving a connection request to a destination, the further steps of:
  i) deterministically selecting a first gateway having an optimum metric with respect to the destination,
  ii) sending a connection request to the first gateway,
  iii) if a connection can not be established to the destination via the first gateway, randomly selecting a second gateway from among the gateways other than the first gateway, and
  iv) sending a connection request to the second gateway; and wherein the step of randomly selecting a second gateway is repeated if a connection can not be established via the second gateway first selected randomly, and the selection is limited to the gateways through which a connection has not already been attempted, and wherein the connection request contains zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

8. A method for a node to select a gateway from among at least two gateways, comprising the steps of:

storing information associating a metric with each gateway with respect to each of one or more destinations;

upon receiving a connection request to a destination, the further steps of:
  i) deterministically selecting a first gateway having an optimum metric with respect to the destination,
  ii) sending a connection request to the first gateway,
  iii) if a connection can not be established to the destination via the first gateway, randomly selecting a second gateway from among the gateways other than the first gateway, and
  iv) sending a connection request to the second gateway; and wherein the step of deterministically selecting a first gateway is repeated if a connection can not be established via the first gateway first selected deterministically, and the selection is limited to the gateways through which a connection has not already been attempted, and wherein the connection request contains zero or more identifiers identifying domains through which the connection route has already passed, the step of deterministically selecting a first gateway does not select a gateway leading to a domain indicated by the identifiers in the connection request, and the step of randomly selecting a second gateway does not select a gateway leading to a domain indicated by the identifiers in the connection request.

* * * * *